(12) United States Patent
Cavanaugh et al.

(10) Patent No.: US 10,060,529 B2
(45) Date of Patent: Aug. 28, 2018

(54) METHOD AND APPARATUS FOR REPAIRING CYLINDER LINERS

(71) Applicant: Caterpillar Inc., Peoria, IL (US)

(72) Inventors: Daniel T. Cavanaugh, Chillicothe, IL (US); Curtis Graham, Peoria, IL (US); Taylor Young, Peoria, IL (US); Luis Vazquez, Peoria, IL (US)

(73) Assignee: Caterpillar Inc., Deerfield, IL (US)

(*) Notice: Subject to any disclaimer, the term of this patent is extended or adjusted under 35 U.S.C. 154(b) by 188 days.

(21) Appl. No.: 14/996,445

(22) Filed: Jan. 15, 2016

(65) Prior Publication Data

US 2017/0204972 A1 Jul. 20, 2017

(51) Int. Cl.
*B23P 6/02* (2006.01)
*F16J 10/04* (2006.01)

(52) U.S. Cl.
CPC .................................. *F16J 10/04* (2013.01)

(58) Field of Classification Search
CPC ............ Y10T 29/4925; Y10T 29/4927; Y10T 29/49272; Y10T 29/49865; Y10T 29/49748; Y10T 29/4975; B23P 6/02; B23P 6/00
See application file for complete search history.

(56) References Cited

U.S. PATENT DOCUMENTS

| | | | |
|---|---|---|---|
| 1,081,257 A | 12/1913 | Sprado | |
| 2,281,332 A * | 4/1942 | Somes | B23P 6/00 148/571 |
| 4,486,938 A | 12/1984 | Hext | |
| 4,724,819 A | 2/1988 | Fleri | |
| H671 H * | 9/1989 | Cho | 264/322 |
| 5,666,725 A | 9/1997 | Ward | |
| 6,044,820 A * | 4/2000 | Domanchuk | C23C 4/185 123/193.2 |
| 6,334,713 B1 | 1/2002 | Chu | |

(Continued)

FOREIGN PATENT DOCUMENTS

| | | | |
|---|---|---|---|
| CN | 201193244 Y | 2/2009 | |
| EP | 0206048 A1 * | 12/1986 | B23P 11/025 |

(Continued)

OTHER PUBLICATIONS

English Translation Shkrabak RU 2121913.*

*Primary Examiner* — Jason L Vaughan
*Assistant Examiner* — Amanda Meneghini
(74) *Attorney, Agent, or Firm* — Baker Hostetler

(57) ABSTRACT

A method for repairing a cylinder liner includes: placing a cylinder liner having a first inner diameter and a first outer diameter into a cavity of a confinement, the cavity including a cavity inner diameter that is substantially the same as the first outer diameter of the cylinder liner; heating the cylinder liner to a temperature at which the cylinder liner undergoes plastic deformation, causing the first inner diameter of the cylinder liner to decrease; and cooling the cylinder liner. The cooled cylinder liner has a second inner diameter that is less than the first inner diameter. An apparatus for repairing a cylinder liner includes a confinement having a cavity and a fluid passageway for controlling the temperature of the confinement, and a heating block for heating the cylinder liner when the cylinder liner is inserted into the cavity.

11 Claims, 3 Drawing Sheets

(56) References Cited

U.S. PATENT DOCUMENTS

| | | |
|---|---|---|
| 7,958,610 B2 | 6/2011 | Benz et al. |
| 8,468,694 B2 | 6/2013 | Moss et al. |
| 8,877,285 B2 | 11/2014 | Silk et al. |
| 2015/0013159 A1 | 1/2015 | Claver et al. |

FOREIGN PATENT DOCUMENTS

| | | |
|---|---|---|
| KR | 100783426 B1 | 12/2007 |
| RU | 2025248 C1 | 12/1994 |
| RU | 2121913 C1 | 11/1998 |
| RU | 2176182 C2 | 11/2001 |

* cited by examiner

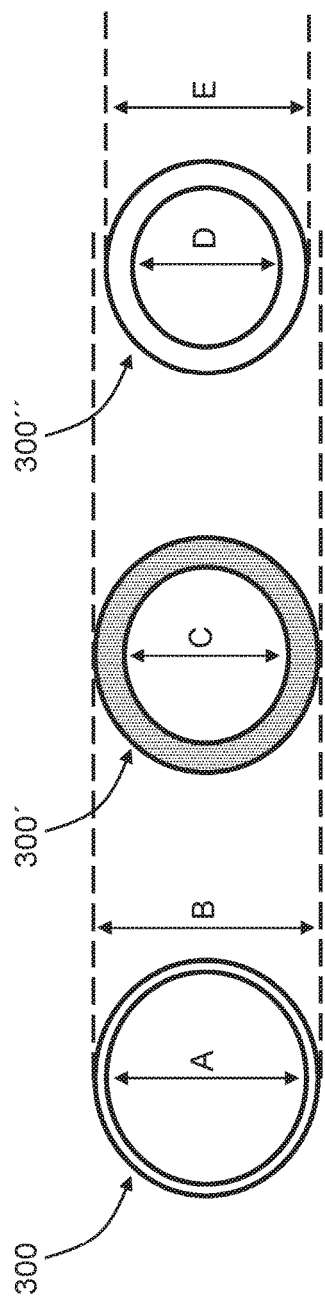
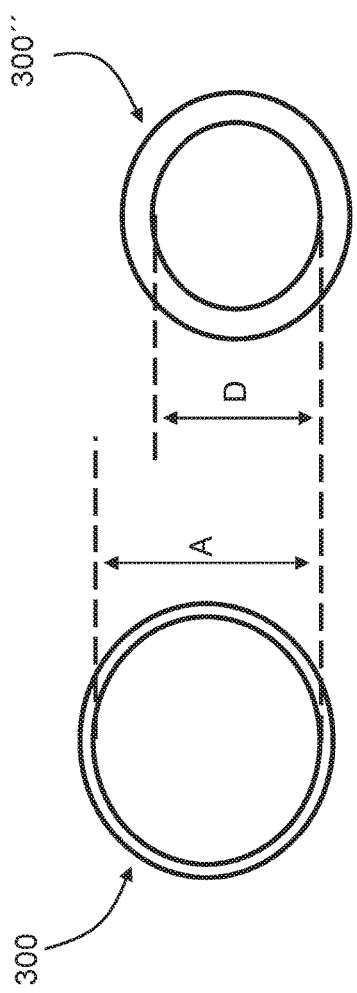
FIG. 3
FIG. 3A

METHOD AND APPARATUS FOR REPAIRING CYLINDER LINERS

TECHNICAL FIELD

The present disclosure relates generally to repairing a cylinder liner, and more particularly, to a method and apparatus for bore shrinking a cylinder liner so that its inner diameter can be re-machined for further use.

BACKGROUND

Cylinder liners are used in various machines that employ a drive train (e.g., a planet carrier bore or a piston). The cylinder liner is placed into the bore or the cylinder of the piston and forms a surface that protects the bore/cylinder from wear. As the cylinder liner is used, its inner surface wears over time, necessitating its repair or replacement.

U.S. Pat. No. 4,486,938 (hereinafter "'938 publication"), titled "Process of remanufacturing pump cylinder liners," purports to describe a process for removing and remanufacturing cylinder liners so that they may be re-used. The process involves extracting the cylinder liner from the cylinder using pulling equipment and cleaning and inspecting the cylinder liner. If it is determined that the cylinder liner is suitable for remanufacture, portions of the interior surface of the cylinder liner are honed and/or ground, which removes metal from the inner diameter of the cylinder liner, causing the inner diameter to increase. The remanufactured cylinder liner can be re-used in a machine having a piston with a slightly larger diameter than the original piston. The process described in the '938 publication does not, however, allow the cylinder liner to be re-used in a machine having the same inner diameter dimensional requirements as before the process was applied.

Accordingly, there is a need for improved methods and systems to address the problems described above and/or problems posed by other conventional approaches.

SUMMARY

In one aspect, the disclosure describes a method for repairing a cylinder liner including: placing a cylinder liner having a first inner diameter and a first outer diameter into a cavity of a confinement, the cavity including a cavity inner diameter that is substantially the same as the first outer diameter of the cylinder liner; heating the cylinder liner to a temperature at which the cylinder liner undergoes plastic deformation, causing the first inner diameter of the cylinder liner to decrease; and cooling the cylinder liner. The cooled cylinder liner has a second inner diameter that is less than the first inner diameter.

In a further aspect, an apparatus for repairing a cylinder liner includes a confinement and a heating block. The cylinder liner includes a first inner diameter and a first outer diameter. The confinement includes a cavity for receiving the cylinder liner and a fluid passageway for controlling the temperature of the confinement. The cavity has a cavity inner diameter that is substantially the same as the first outer diameter of the cylinder liner. The heating block heats the cylinder liner when it is inserted into the cavity, and is configured to cause the cylinder liner to undergo plastic deformation when the cylinder liner is heated, resulting in a decrease in the first inner diameter of the cylinder liner.

It is to be understood that the disclosure is not limited in its application to the details of construction and to the arrangements of the components set forth in the following description or illustrated in the drawings. The disclosed device and method are capable of aspects in addition to those described and of being practiced and carried out in various ways. Also, it is to be understood that the terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the various aspects. It is important, therefore, that the claims be regarded as including such equivalent constructions insofar as they do not depart from the spirit and scope of the various aspects.

BRIEF DESCRIPTION OF THE DRAWINGS

FIG. 3 illustrates the change in dimensions of a cylinder liner when a method according to the present disclosure is applied thereto.

FIG. 3A illustrates a comparison of the dimensions of the cylinder liner before and after a method according to the present disclosure is applied thereto.

The drawings presented are intended solely for the purpose of illustration and therefore, are neither desired nor intended to limit the subject matter of the disclosure to any or all of the exact details of construction shown, except insofar as they may be deemed essential to the claims.

DETAILED DESCRIPTION

Figure 1:
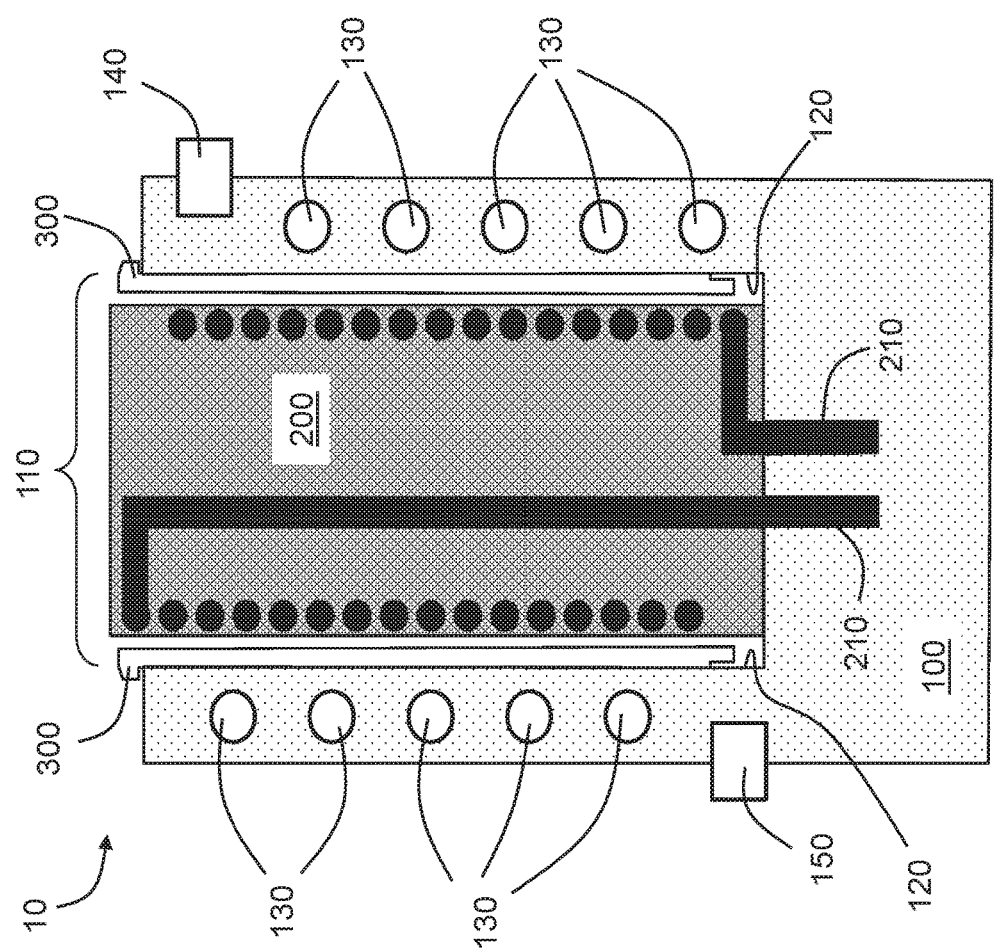
FIG. 1 is a side section view of a confinement according to an aspect of the present disclosure.
Figure 2:
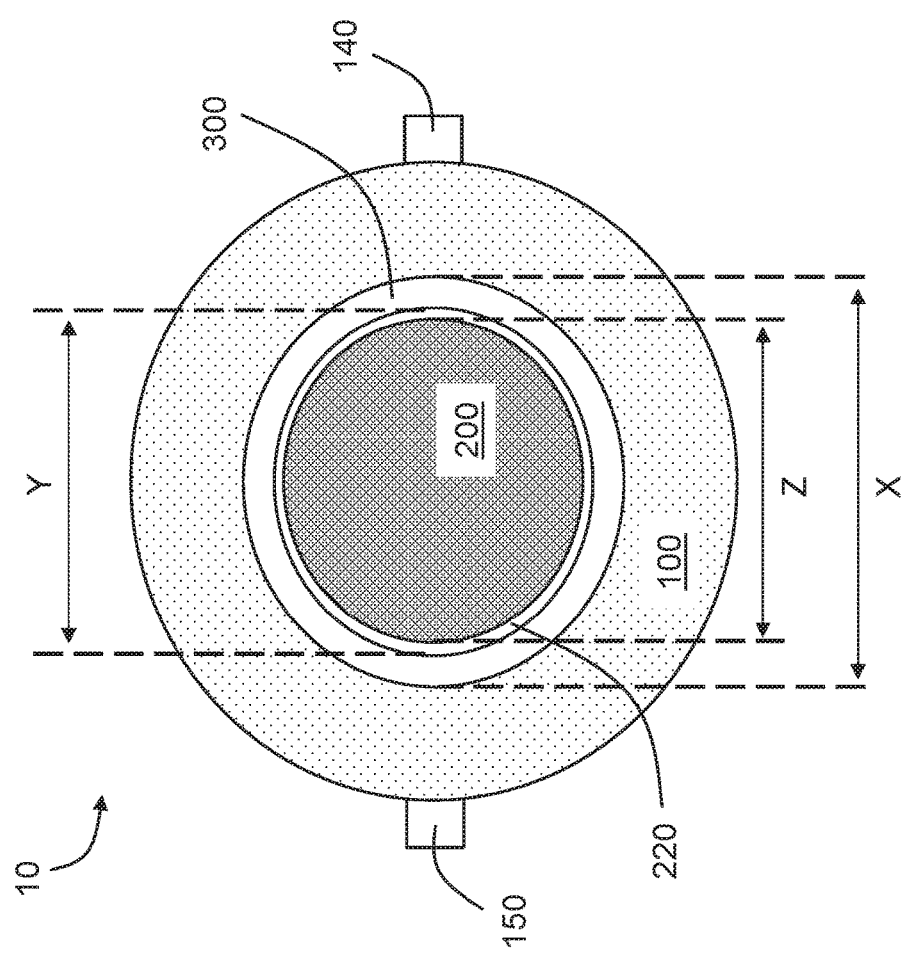
FIG. 2 is a top view of the confinement of FIG. 1.

FIGS. 1 and 2 illustrate an apparatus 10 for repairing a cylinder liner 300. More specifically, the apparatus 10 provides for heating the cylinder liner 300 to cause it to deform plastically inward, resulting in a slight decrease in its inner diameter and additional liner "stock" being added to the inner surface of the cylinder liner 300. The inner surface of the cylinder liner 300 can then be machined to allow it to be used again. The apparatus 10 may include a confinement 100 and a heating block 200 for heating a cylinder liner 300.

The confinement 100 may include an inside wall 120. At least a portion of the inside wall 120 may define a volume or cavity 110 sized to receive the cylinder liner 300. More specifically, the cavity 110 may have a cavity inner diameter X that is substantially the same as the outer diameter of the cylinder liner 300, so that when the cylinder liner 300 is inserted into the cavity 110, the cylinder liner 300 contacts the inside wall 120 of the cavity 110. As used herein, "substantially the same" refers to a cavity inner diameter X that will allow the cylinder liner 300 to be inserted therein (according to aspects described herein) and that will force the cylinder liner 300 to deform plastically inward when the cylinder liner 300 is heated. In one aspect (further described below), a cavity inner diameter X that is sized to place the inside wall 120 of the cavity 110 and the outer surface of the cylinder liner 300 in interference fit contact may be considered to be substantially the same as the outer diameter of the cylinder liner 300. Other types of contact other than an interference fit contact are possible, however, and are within the scope of "substantially the same" as this term is used herein.

The confinement 100 may also include a temperature control feature that allows the confinement to be heated and/or cooled as desired during operation of the apparatus 10, as discussed below. In one aspect illustrated in FIG. 1, the temperature control feature is a fluid passageway 130 through which a heated or cooled fluid is circulated. The fluid passageway 130 may include a fluid inlet 140 and a fluid outlet 150 through which a heated or cooled fluid is directed from a fluid source (not shown). Exemplary heated fluids include but are not limited to oil or liquid metal. While the aspect illustrated in FIG. 1 depicts the temperature control feature as being internal to the confinement 100, it need not be. For example, the temperature control feature could be or include fluid coils or an electrical heater that is in contact with the outside surface of the confinement and as long as the temperature control feature provides sufficient heat transfer to or from the confinement.

In some aspects, the temperature control feature (such as the illustrated and above-described fluid passageway 130) may be used to heat the confinement 100 prior to inserting the cylinder liner 300 therein. The confinement 100 may include high strength steel or any other material with the strength and hardness to withstand the high temperatures and pressures to which it will be subjected. Because the cavity 110 has a cavity inner diameter X that is substantially the same as the outer diameter of the cylinder liner 300, it may be difficult to insert the cylinder liner 300 therein. Thus, heating the confinement 100 prior to inserting the cylinder liner 300 therein can cause the confinement 100 to expand and its inner diameter X to temporarily increase and allow the cylinder liner 300 to be inserted. Thereafter, the confinement 100 can be cooled, resulting in contraction of the confinement 100 and allowing the outer surface of the cylinder liner 300 to contact, or mate with, the inside wall 120 of the cavity 110.

In another aspect, rather than heating the confinement 100 to expand it and allow the cylinder liner 300 to be inserted therein, the cylinder liner 300 may be cooled prior to placing it into the confinement 100. In such an aspect, cooling the cylinder liner 300 could cause it to contract and allow it to be inserted into the confinement 100.

In some aspects, the cavity 110 of the confinement 100 may be sized and configured so that when the cylinder liner 300 is inserted therein and the temperatures of the confinement 100 and cylinder liner 300 have stabilized, the inside wall 120 of the cavity 110 and the outer surface of the cylinder liner 300 are in interference fit contact. In a particular aspect, the interference fit is a p6 interference fit. In other aspects, the contact between the inside wall 120 of the cavity 110 and the outer surface of the cylinder liner 300 may be something other than an interference fit, e.g., a transition fit or a clearance fit, provided the confinement 100 retains the cylinder liner 300 sufficiently to cause the cylinder liner 300 to deform plastically inward when the cylinder liner is heated. Interference fits and other types of tolerances may be described with reference to ISO 286-1: 2010 (Geometrical product specifications (GPS)-ISO code system for tolerances on linear sizes) and/or ISO 1829:1975 (Selection of tolerance zones for general purposes) (Revised by ISO 286-1:2010). In accordance with these standards, a p6 interference fit may be identified as a locational interference fit for parts requiring rigidity and alignment with prime accuracy of location but without special bore pressure requirements.

The apparatus 10 may also include a heating block 200 for heating the cylinder liner 300 and causing it to deform plastically inward. The heating block 200 may include a heater 210, which in certain aspects may be an induction heater. The induction heater may be embedded in the heating block 200. In one aspect, the heating block 200 includes an epoxy resin and the induction heater is embedded therein. In an exemplary induction heater, an alternating (AC) current is passed through an inductor coil. A fluid may be passed through the inductor coil to keep the inductor coil cool. When the workpiece/part to be heated (e.g., the cylinder liner 300) is subjected to the AC current passing through the inductor coil, the workpiece/cylinder liner 300 becomes a short circuit secondary and heats up.

In other aspects the heater 210 includes a fluid passageway, such as coils, through which a heated fluid can be passed. Passing the heated fluid, such as but not limited to heated oil or liquid metal, through the coils results in heat being transferred to the cylinder liner 300. In some aspects, the heating block 200 may be sized so that it has an outer diameter Z that is less than the inner diameter Y of the cylinder liner 300, resulting in a gap 220 between the heating block 200 and the cylinder liner 300. In some aspects a cooled fluid (e.g., cooled water or oil) may be passed through the fluid passageway 130 while the cylinder liner 300 is being heated to prevent heat from the cylinder liner 300 from causing the confinement 100 to heat up and expand. Any suitable method for heating the heating block 200 may be used, as long as the heating block 200 can sufficiently heat the cylinder liner 300 and cause it to deform plastically inward. In some aspects, the cylinder liner may be heated to a temperature of about 300° C. to about 500° C. to cause it to undergo plastic deformation.

When the cylinder liner 300 is inserted into the cavity 110 of the confinement 100 and placed into contact therewith (e.g., in an interference fit such as that discussed above), the heating block 200 may be operated to cause the temperature of the cylinder liner 300 to increase. When the cylinder liner—which may include any suitable material (such as but not limited to cast iron, ductile iron, steel and aluminum)—heats up, it would expand outward if it were not constrained by the confinement 100. However, because the cylinder liner 300 cannot expand outward, it instead deforms plastically inward to relieve the stress caused by the heating, causing its inner diameter Y to decrease. When the cylinder liner 300 is subsequently cooled, its inner diameter Y is less than it was prior to plastic deformation, allowing the inner surface of the cylinder liner 300 to be machined and re-used. The changes in dimensions of the cylinder liner 300 are illustrated in FIGS. 3 and 3A. An initial, cooled cylinder liner 300 has a first inner diameter A and a first outer diameter B. When heated in a confinement, the heated cylinder liner 300' deforms plastically inward, resulting in an inner diameter C that is less than the first inner diameter A. When the plastically deformed cylinder liner 300" is cooled, it has a second inner diameter D that is less than the first inner diameter A. The second outer diameter E of the plastically deformed cylinder liner 300" may be, but does not necessarily have to be, less than the first outer diameter B of the cooled cylinder liner 300.

It should be noted that the dimensional changes illustrated in FIGS. 3 and 3A are not drawn to scale and are exaggerated. In some aspects, the second inner diameter D of the cooled, plastically deformed cylinder liner 300" is from about 0.01% to about 0.25% less than the first inner diameter A of the cooled cylinder liner 300. The reduction in diameter will vary based on numerous factors, including but not limited to the cylinder liner material and its coefficient of thermal expansion, the temperature to which the cylinder liner is heated, and the size of the cylinder liner.

Once cooled, the cylinder liner 300 may be removed from the apparatus 10. As discussed above, the outer diameter of the cylinder liner 300 after plastic deformation may be less than its initial outer diameter. This reduction in outer diameter may result in a relaxation of the interference fit between the cylinder liner 300 and the inside wall 120 of the cavity 110, allowing for removal of the cylinder liner 300 from the confinement 100 without further processing. If, however, the outer diameter of the cylinder liner 300 is not reduced or is not sufficiently reduced so as to allow it to be easily removed, further processing steps may be applied. In one aspect, the confinement 100 is heated according to aspects described above to cause it to expand and to allow the inside wall 120 of the cavity 110 to separate from the cylinder liner 300, allowing it to be removed from the confinement 100. In other aspects, the cylinder liner 300 may be further cooled, such as by passing a cooled fluid through the heating block 200, causing the cylinder liner 300 to further contract and separate from the inside wall 120 of the cavity 110, allowing for its removal from the confinement 100.

INDUSTRIAL APPLICABILITY

Cylinder liners are used in various machines that employ a drive train (e.g., a planet carrier bore or a piston). The cylinder liner is placed into the bore or the cylinder of the piston and forms a surface that protects the bore/cylinder from wear. As the cylinder liner is used, its inner surface wears over time, necessitating its repair or replacement. The disclosed apparatus 10 may be applicable to apparatus and methods for repairing a cylinder liner so that it may be re-used.

In accordance with aspects of the present disclosure described herein, a method for repairing a cylinder liner 300 may include placing a cylinder liner 300 having a first inner diameter and a first outer diameter into a cavity 110 of a confinement 100, the confinement including a cavity inner diameter X that is substantially the same as the first outer diameter of the cylinder liner 300. The cylinder liner 300 may be heated to a temperature at which the cylinder liner 300 undergoes plastic deformation, causing the first inner diameter of the cylinder liner 300 to decrease, and the cylinder liner 300 is cooled. The cooled cylinder liner 300 may have a second inner diameter that is less than the first inner diameter.

The method may further include heating the confinement 100 prior to placing the cylinder liner 300 into the confinement 100 such that the cavity 110 of the confinement 100 expands and the cavity inner diameter X increases. The expansion of the cavity 110 may allow placement of the cylinder liner 300 into the cavity 110 of the confinement 100. Once placed into the cavity 110, the confinement 100 may be cooled to allow the cavity inner diameter X to decrease and cause the cylinder liner 300 to mate with the cavity 110 of the confinement 100. In some aspects, the mating of the cavity 110 of the confinement 100 with the cylinder liner 300 can result in an interference fit between the cylinder liner 300 and the confinement 100. In a particular aspect, the interference fit is a p6 interference fit.

The plastic deformation of the cylinder liner 300, which is forced towards the direction of the center of the cylinder liner by the confinement of the cylinder liner 300 in the cavity 110 of the confinement 100, may result in a decrease of the inner diameter of the cylinder liner. The reduction in inside diameter of the cylinder liner 300 provides additional material on the inner wall of the cylinder liner 300 that allows it to be machined (or re-machined) to a required specification and then re-used. The machining may be performed with any known tools suitable to remove a thin layer of material to bring the inside diameter back within a specification range. Heating and cooling of the confinement 100 and cylinder liner 300 may be accomplished using methods and systems described above.

It will be recognized that the process of repairing the cylinder liner results in some cylinder wall material being removed each time the cylinder liner 300 is machined. Thus, it may only be possible to apply the methods disclosed herein to plastically deform and then repair the cylinder liner 300 a finite number of times before the strength or other properties of the cylinder liner 300 prevent further applications of the method thereto. Additionally, as described herein application of the method to the cylinder liner 300 may cause the outer diameter of the cylinder liner 300 to also decrease as a result of the inward plastic deformation of the cylinder liner 300. Generally, however, manufacturing tolerances for the outer diameter of a cylinder liner are higher than for its inner diameter, so any decrease in outer diameter of the cylinder liner may be accommodated by the o-ring(s) that are typically placed between the cylinder liner and the bore or cylinder of the machine.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Throughout the disclosure, like reference numbers refer to similar elements herein, unless otherwise specified.

We claim:

1. A method for repairing a cylinder liner, the method comprising:
   placing a cylinder liner comprising a first inner diameter and a first outer diameter into a cavity of a confinement, the cavity comprising a cavity inner diameter that is substantially the same as the first outer diameter of the cylinder liner;
   heating the cylinder liner to a temperature of about 300° C. to about 500° C. at which the cylinder liner undergoes plastic deformation, causing the first inner diameter of the cylinder liner to decrease; and
   cooling the cylinder liner, wherein the cooled cylinder liner comprises a second inner diameter that is less than the first inner diameter.

2. The method of claim 1, wherein the cooled cylinder liner comprises a second outer diameter that is less than the first outer diameter.

3. The method of claim 1, further comprising:
   heating the confinement prior to placing the cylinder liner into the cavity such that the cavity inner diameter increases to allow placement of the cylinder liner into the cavity; and cooling the confinement after placing the cylinder liner into the cavity such that the cavity inner diameter decreases and causes the cylinder liner to mate with the cavity and result in an interference fit between the cylinder liner and the cavity.

4. The method of claim 3, wherein the interference fit is a p6 interference fit.

5. The method of claim 3, wherein the confinement is heated or cooled by circulating a heated or cooled fluid through the confinement.

6. The method of claim 5, wherein the fluid is oil.

7. The method of claim 1, further comprising cooling the cylinder liner prior to placing the cylinder liner into the cavity such that the first inner diameter of the cylinder liner decreases to allow placement of the cylinder liner into the cavity.

8. The method of claim 1, wherein the cylinder liner is heated with an induction heater.

9. The method of claim 1, further comprising:
machining the second inner diameter of the cylinder liner.

10. The method of claim 1, further comprising removing the cooled cylinder liner from the cavity of the confinement.

11. The method of claim 10, wherein removing the cooled cylinder liner from the confinement comprises heating the confinement to cause the cavity to expand and allow removal of the cooled cylinder liner, or further cooling the cylinder liner to cause the cylinder liner to contract and allow removal of the further cooled cylinder liner.

* * * * *